Oct. 17, 1967 C. PIZZO 3,347,181
METHOD FOR MAKING PIZZA PIES
Filed Sept. 9, 1965
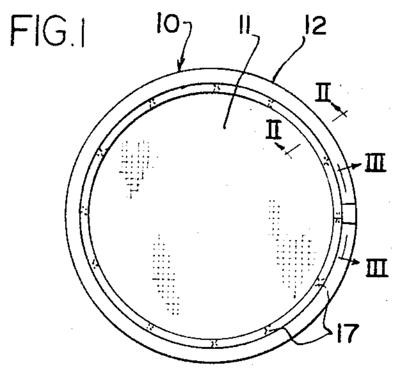
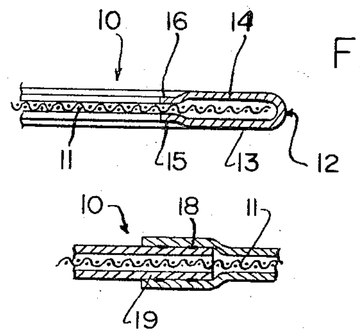
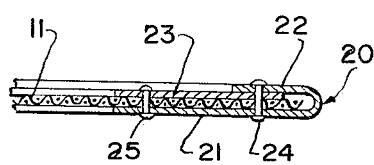
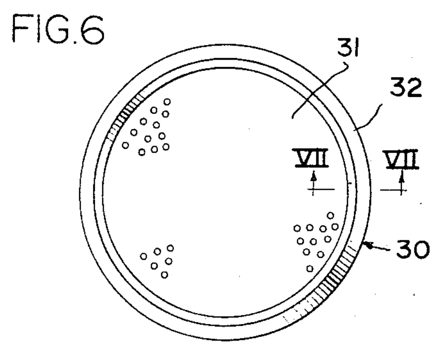
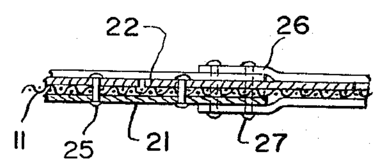
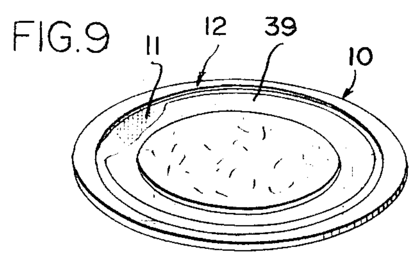
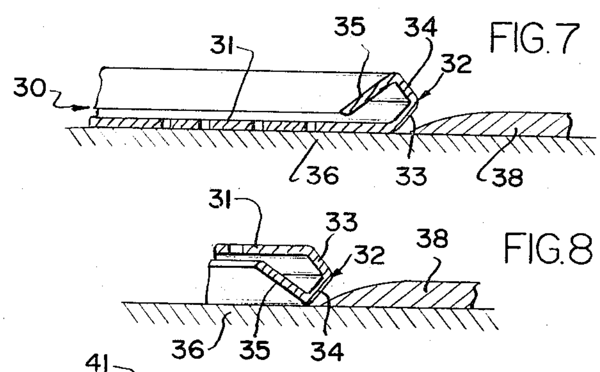
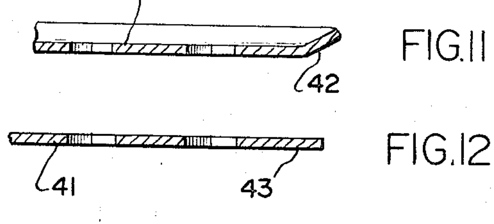
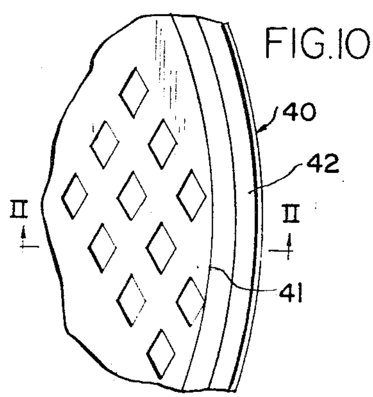
INVENTOR
CHARLES PIZZO
BY *Alberts, Brezina & Lund*
ATTORNEYS United States Patent Office 3,347,181

Patented Oct. 17, 1967

1

3,347,181

METHOD FOR MAKING PIZZA PIES

Charles Pizzo, 2643 73rd Court, Elmwood Park, Ill. 60635

Filed Sept. 9, 1965, Ser. No. 485,996
4 Claims. (Cl. 107—54)

This invention relates to pizza pie making and more particularly to methods and apparatus for pizza pie making wherein pizza pies having base layers of superior texture and taste can be produced with high efficiency and with a minimum length of time between receiving and filling of an order.

In the prior are method of making pizza pies for sale, the cook in response to an order from a consumer, rolls out a layer of dough on a large flat surface of a peel, then places a topping on the layer of dough and then slides the topped layer into an oven to rest upon a heated flat surface therewithin. This method has been time consuming and considerable care has been required in the sliding of the dough layer from the peel to the oven. In addition, it has been necessary to use bread crumbs on the peel, underlying the dough layer, to permit sliding of the layer therefrom. Such bread crumbs usually burn into hard pieces and detract from the appearance and taste of the pizza pie.

According to an important feature of this invention, a method of making pizza pies is provided wherein dough is rolled into a plurality of round flat layers which are placed on discs having a circular shape and being substantially flat. As an order is received from a consumer, a topping of the consumer's preferance is placed on a layer and the disc with the layer and the topping therein is placed in an oven for baking. The baked pizza pie is then removed from the disc for serving. With this system, the layers of dough can be prepared in advance and a minimum length of time is required between receiving and filling an order. In addition, it is not necessary to use corn meal, bread crumbs or the like.

According to an important specific feature of the invention, the layers are allowed to set on the discs after being stretched thereon, for a certain length of time sufficient to allow the dough to raise to form new cells. With this feature, the base layer of the baked pie has a fine, light texture and superior flavor which cannot be obtained with the prior method.

Further important features of the invention relate to the construction of the discs on which the layers are stretched. The prior art has proposed various types of baking pans but such pans have not been suitable for pizza pie making. The prior types of baking pans have either been of rectangular shapes not suitable for pizza pies or have had peripheral structures which would prohibit rise for pizza pies.

According to an important feature, a disc is provided having a generally circular shape and being substantially flat, the disc being foraminous to allow heat to be applied to the underside thereof to rapidly heat the disc and to bake the underside of a pizza pie supported thereon.

In certain preferred embodiments of the disc, it includes a central load-carrying portion of a screen-like material and an annular frame having an inwardly facing groove receiving the periphery of the load-carrying portion.

In another preefrred embodiment, the disc is in the form of a flat foraminous metal plate.

Additional features of the invention relate to constructions of a frame to securely support the periphery of a load-carrying portion of a screen-like material and to provide a desired spacing between the screen-like material and a supporting surface.

This invention contemplates other objects, features and advantages which will become more fully apparent from

2 the following detailed description taken in conjunction with the accompanying drawings which illustrate preferred embodiments and in which:

FIGURE 1 is a top plan view of a preferred form of pizza pie baking disc constructed according to the principles of the invention;

FIGURE 2 is a sectional view taken substantially along line II—II of FIGURE 1, showing the construction of a rim portion of the disc;

FIGURE 3 is a sectional view taken substantially along line III—III of FIGURE 1, showing a joint in the rim portion of the disc;

FIGURE 4 is a sectional view similar to FIGURE 2, showing the construction of a rim portion of a modified disc;

FIGURE 5 is a sectional view similar to FIGURE 3, showing a joint of the rim portion of the modified disc of FIGURE 4;

FIGURE 6 is a top plan view of another modified form of baking disc constructed according to the invention;

FIGURE 7 is a sectional view taken substantially along line VII—VII of FIGURE 6, showing the construction of a rim portion of the disc;

FIGURE 8 is a sectional view similar to FIGURE 7 but with the disc reversed and showing the use of a scoop in connection with the disc;

FIGURE 9 is a perspective view showing the use of a thin foil disc in connection with the disc of FIGURE 1;

FIGURE 10 is a top plan view of a peripheral portion of another modified form of the disc according to the invention;

FIGURE 11 is a sectional view taken substantially alone line XI—XI of FIGURE 10; and FIGURE 12 is a sectional view similar to FIGURE 11 but illustrating a further modification.

Reference numeral 10 generally designates a baking platter for pizza pies in the form of a disc which has a generally circular shape and is substantially flat.

According to the invention a suitable pizza dough is mixed, allowed to set and pounded down at least once, preferably being allowed to set and being pounded down a second time. The dough is then rolled into a plurality of round flat layers which are stretched on a plurality of the discs 10. By way of example, layers may be placed on twenty-five or fifty or more of the discs 10 at one time. A topping of cheese, sausage, tomato sauce or the like may then be applied on a layer or a disc with the disc being then placed immediately in an oven to bake. Preferably, however, and in accordance with a specific feature of the invention, the layers are allowed to set on the discs for a certain length of time, at least for a half hour in order that the dough can raise to form new cells. Then as orders are received from consumers, the topping selected by the consumer is applied and the disc 10 is placed immediately in an oven to bake. After baking, the pie can then be slid off the disc 10 onto a plate or the like for serving.

With this system, each order can be filled in a minimum length of time, while a pizza pie of superior taste and texture is produced. The raising of the dough on the discs is very important in this respect since the baked layer then has a fine light, tender crisp and flaky texture and excellent flavor, while having the requisite form sustaining qualities, without falling apart when served. Such qualities cannot be obtained with the prior method, wherein a layer is rolled on a peel with the topping being immediately applied and the topped layer being immediately placed in an oven to bake. Furthermore, it is not necessary to use bread crumbs, corn meal or the like such as required in the prior method in order to permit the layer to slide off the peel. Such bread crumbs, corn meal and the like burns to create a bad taste and disagreeable appearance.

Still another advantage is the fact that a considerable number of the layers can be prepared in advance and the cook during slack periods can prepare the layers so that during rush periods he need only apply the topping and bake the pies. Thus, the cook's time is used more efficiently. In this connection, it is possible after stretching the layers on the discs and after allowing such layers to rise, to store the discs with the layers thereon in the refrigerator for an indefinite length of time. They may then be removed from the refrigerator when required. Thus mass production of the layers is possible.

Any suitable rising pizza pie dough may be used. By way of example, the dough may be prepared by mixing ten pounds of flour with just enough water to wet the flour, and with a keg of yeast, about two tablespoons of salt and a cup of oil or shortening.

Referring to FIGURE 1, the disc 10 comprises a central load-carrying portion 11 of a screen-like material having a peripheral edge portion supported by an annular rim 12. The use of the screen-like material 11 to provide a foraminous construction is highly desirable in that it allows heat to be applied to the underside thereof to rapidly heat the disc and to bake the underside of the pizza pie supported thereon.

As shown in FIGURE 2, the annular rim or frame 12 is in the form of an inwardly opening channel receiving the periphery of the portion 11 and having legs 13 and 14, with inner end portions 15 and 16 of the legs being forced toward each other to clinch the portion 11 therebetween. Preferably, a plurality of spot welds 17 are provided at spaced points, integrally connecting the inner end portions 15 and 16 through the portion 11 of screen-like material.

Preferably, for ease of construction and to permit the periphery of the portion 11 to be readily inserted into the rim or frame 12, the frame is open, with free ends which are brought together after insertion of the portion 11 of screen-like material therein. As shown in FIGURE 3, one of the free ends, designated by reference numeral 18 may be enlarged to receive the other end, designated by reference numeral 19.

FIGURE 4 is a sectional view similar to FIGURE 2, but showing the modified construction wherein a rim or frame 20 is provided for receiving the peripheral edge of the portion 11, the frame 20 being in the form of an inwardly facing channel having lower and upper legs 21 and 22, with the periphery of the portion 11 and a flat ring 23 being disposed between the legs 21 and 22. Rivets 24 extend through the lower leg, the portion 11, the ring 23 and the upper leg 22 and rivets extend through the lower leg 21, the portion 11 and the ring 23, the upper leg 22 being preferably shorter than the lower leg, to facilitate assembly. As shown in FIGURE 5, one end portion 26 of the frame 20 is enlarged to receive the other end portion, with rivets 27 extending through both end portions to lock the two ends together.

Referring to FIGURE 6, reference numeral 30 generally designates a modified form of pizza platter, in the form of a one-piece sheet metal disc having a perforated central load-carrying portion 31 and an integral solid rim portion 32. As shown in FIGURE 7, the rim portion 32 is bent back on itself to be of hollow form and to provide a thickness greater than that of the central portion 31. As shown, the rim portion 32 includes a portion 33 projecting outwardly and upwardly, a portion 34 extending upwardly and inwardly from the portion 33, and a portion 35 extending downwardly and inwardly from the portion 34.

As shown in FIGURE 7, the disc 30 may be disposed on floor 36 of an oven with the central portion 31 flat against the oven floor 36. With this arrangement, the central portion can be rapidly heated when the disc is disposed in the oven. In the alternative, the position of the disc 30 may be reversed as shown in FIGURE 8, such that the rim portion 32 serves to support the central portion 31 in spaced relation to the oven floor 36. With this arrangement, the central portion 31 is not heated quite so rapidly, but an advantage is obtained in that air may freely circulate in the space between the central portion 31 and the oven floor 36, to flow through the apertures in the central portion 31, and to bake the bottom of the pizza pie. For removal from the oven, a scoop or peel 38 may be moved under the disc 30, a lifting action being obtained by engagement of the edge of the peel with the portion 33, as shown in FIGURE 7, or with the portion 34, as shown in FIGURE 8.

It may be noted that with the disc 10 shown in FIGURES 1–3, or with the modified form of disc shown in FIGURES 4 and 5, the rim or frame portion provides a certain spacing between the central portion of screen-like material and the oven floor, for air circulation. With the use of a screen-like material, the heating is sufficiently rapid so that no problem is encountered in this regard, and air can freely circulate for baking of the underside of the layer of dough disposed on the disc.

FIGURE 9 shows the use of an aluminum or other metal foil 39 on the central portion 11 of the disc 10 for supporting a pizza pie in baking. In this case, the pie is baked on the foil, and heating of the foil is facilitated by air circulation in the space between the oven floor and the central portion 11 of screen-like material. The metal foil in this case may be disposable and may be used for serving the pizza pie.

FIGURE 10 illustrates another form of disc 40 of a one-piece sheet metal construction including a central load-carrying portion 41 having diamond shaped apertures therein, rather than the circular apertures of the platter or disc 30 shown in FIGURE 6. The disc 40 further includes an integral rim portion 42. As shown in FIGURE 11, the rim portion 42 may be turned upwardly to facilitate removal from the oven, or to provide a spacing between the central portion 41 and the oven floor, when the position of the disc 40 is reversed. In the alternative, as shown in FIGURE 12, a rim portion 43 may be formed in coplanar relation to the central portion 41.

It will be understood that modifications and variations may be effected without departing from the spirit and scope of the novel concepts of this invention.

I claim as my invention:

1. In a method of making pizza pies, the steps of making a dough, allowing said dough to set and pounding said dough down at least once, providing a plurality of round flat discs, rolling portions of said dough into round flat layers, disposing said layers on said discs, allowing said layers to set for a time, applying topping to said layers, immediately placing said discs with said layers and topping thereon in an oven to bake to form pizza pies and thereafter removing said pizza pies from said discs for serving.

2. In a method as defined in claim 1, the step of providing openings in said round flat discs to provide a foraminous support for said layers and to allow heat to be rapidly applied to the underside of said layers upon placement of said discs with said layers and topping thereof in the oven.

3. In a method of making pizza pies to order with toppings according to the selection of consumers, the steps of making a rising pizza dough, providing a plurality of flat discs, applying said dough in layers on said discs, allowing said layers to set on said discs for a time sufficient to allow substantial rising of the dough, thereby to provide a plurality of pre-prepared base layers on said discs, applying in response to an order from a consumer a topping to one of said layers according to the preference of the consumer, immediately placing said disc with the layer and topping thereon in an oven to form a baked pizza pie thereon, and removing said disc from the oven with said baked pizza pie thereon, and removing said baked pizza pie from said dics to serve to the consumer.

4. In a method of making pizza pies, the steps of mixing flour, water, yeast and salt to form a dough, allowing said dough to set and pounding said dough down at least once, providing a plurality of round flat discs, rolling portions of said dough into round flat layers, disposing said layers on said discs, allowing said layers to set for a time sufficient for raising thereof and formation of new cells, applying topping to said layers, immediately placing said discs with said layers and topping thereon in an oven to bake to form a pizza pie and thereafter removing said pizza pie from said discs for serving.

References Cited

UNITED STATES PATENTS

| | | | |
|---|---|---|---|
| 2,187,354 | 1/1940 | MacManus | 107—56 X |
| 2,190,483 | 2/1940 | Pacilio | 107—1 |
| 2,597,627 | 5/1952 | Fader et al. | 107—55 |
| 2,668,117 | 2/1954 | Bucci. | |
| 2,890,662 | 6/1959 | Baiocchi | 107—14 |
| 3,221,672 | 12/1965 | Falco | 107—1 |

WALTER A. SCHEEL, *Primary Examiner.*

J. SHEA, *Assistant Examiner.*